United States Patent [19]

Sen et al.

[11] Patent Number: 5,789,530
[45] Date of Patent: Aug. 4, 1998

[54] CATALYZED SYNTHESIS OF ARAMID FROM CARBON MONOXIDE, AROMATIC DICHLORIDES, AND DIAMINES

[75] Inventors: Ayusman Sen; Jang Sub Kim, both of State College, Pa.

[73] Assignee: The Penn State Research Foundation, University Park, Pa.

[21] Appl. No.: 771,322

[22] Filed: Dec. 20, 1996

[51] Int. Cl.$^6$ .......................... C08G 69/08; C08G 73/10; C08G 67/02
[52] U.S. Cl. .................... 528/310; 528/392; 528/422; 528/491; 528/492; 525/539
[58] Field of Search ...................... 528/392, 422, 528/310, 491, 492; 525/539

[56] References Cited

U.S. PATENT DOCUMENTS

| | | | |
|---|---|---|---|
| 4,933,419 | 6/1990 | Perry et al. | 528/397 |
| 5,104,971 | 4/1992 | Perry et al. | 528/422 |
| 5,214,127 | 5/1993 | Perry et al. | 528/422 |
| 5,521,281 | 5/1996 | Sen et al. | 528/392 |
| 5,672,750 | 9/1997 | Perry | 564/132 |

OTHER PUBLICATIONS

R.J. Perry, "Making Aramids Using CO and Palladium Catalysis", Chemtech, Feb. 1994, pp. 18–23.

Y. Ben–David et al., "Chelate–Assisted, Pd–Catalyzed Efficient Carbonylation of Aryl Chlorides", J. Am. Chem. Soc., vol. 111, No. 23, 1989, pp. 8742–8744.

R.J. Perry et al., "Palladium–Mediated Carbonylation and Coupling Reactions of Iodobenzene and Aniline. Model Reactions for the Preparation of Aromatic Polyamides", Macromolecules 1993, 26, 1503–1508.

S.R. Turner et al., "High Molecular Weight Aromatic Polyamides from Aromatic Diiodides and Diamines", Macromolecules 1992, 25, 4819–4820.

Y. Imai, "A Flexible Route to Carbon–Carbon Polymers", Chemtech, Sep. 1991, pp. 560–564.

*Primary Examiner*—P. Hampton-Hightower
*Attorney, Agent, or Firm*—Richard P. Fennelly; Louis A. Morris

[57] ABSTRACT

The synthesis of an aramid by the catalyzed reaction of carbon monoxide, an aromatic dichloride, such as 1,4-dichlorobenzene, and a diamine, such as 1,4-diaminobenzene, is disclosed. The reaction may be catalyzed by palladium (II) and palladium (0)-containing catalysts with chelating trialkyl phosphines, such as bis(diisopropylphosphino)-propane.

7 Claims, No Drawings

CATALYZED SYNTHESIS OF ARAMID FROM CARBON MONOXIDE, AROMATIC DICHLORIDES, AND DIAMINES

Aramids are currently manufactured by the condensation reaction between the corresponding aromatic diacid chlorides and diamines. It would be highly desirable to replace the aromatic diacid chlorides with the much less expensive combination of aromatic dichlorides and carbon monoxide. Aromatic dibromides and diiodides undergo palladium(II)-catalyzed reaction with carbon monoxide and aromatic diamines to yield aramids (See, R. J. Perry, Chemtech 1994 (2), 18 and Y. Imai, Chemtech 1991 (9), 560). However, the corresponding aromatic dichlorides, which are significantly less expensive, have been reported to be unreactive under similar conditions.

SUMMARY OF THE INVENTION

The present invention relates to the synthesis of aramids by the palladium(II)-catalyzed reaction of carbon monoxide, aromatic dichlorides, and diamines.

DESCRIPTION OF THE PREFERRED EMBODIMENTS

In practicing the present invention, the chosen aromatic dichloride reagent can be selected from any of the following formulae which illustrate the types of aromatic dichloride reagents which can be employed, with the linking group, X, being selected from such groups as C(O), OC(O), hydrocarbyl such as straight chain, $(CH_2)_n$, or branched chain alkylene or arylene, fluorinated hydrocarbyl, such as $C(CF_3)_2$, O, $SO_2$, CHX' (X' being halo), $CHC_6H_5$, and $CHN(R)_2$ (R being hydrocarbyl such as alkyl):

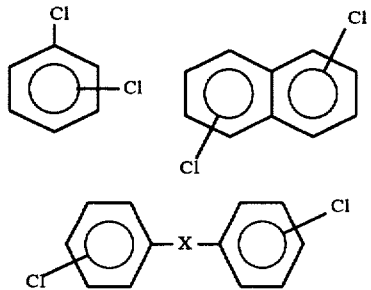

Particularly preferred aromatic dichlorides are the unsubstituted or substituted dicholorobenzenes, with 1,4-dichlorobenzene being the most preferred reagent for use.

The diamine reagent for use in the process of the present invention can be selected from aromatic amines which do not contain electron-withdrawing substituents and which have the following formulae where the linking group (X) is non-electron withdrawing and can be selected from such groups as $CH_2$, O, $CHC_6H_5$, and $CHN(R)_2$ (R being hydrocarbyl such as alkyl):

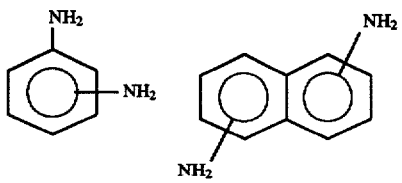

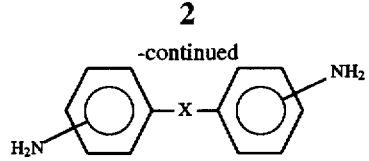

Representative preferred examples of such diamines include the phenylenediamines (e.g., 1,4-phenylene diamine), the methylenedianilines (e.g., 4,4'-methylenedianiline), the oxydianilines (e.g., 4,4'-oxydianiline), and diaminonaphthalenes (e.g., 1,5-diaminonaphthalene).

The catalyst to use in regard to the present invention can be selected from those palladium(0) and palladium(II) complexes with monodentate and bidentate phosphine ligands. For example, the following formulae, where R is independently selected from alkyl or aryl, L is a hydrocarbyl linkage, and X is an anionic group, may be employed. U.S. Pat. No. 5,227,464 to J. J. Keijsper, which is incorporated herein by reference, supplies a teaching as to representative moieties for L and X (see, for example, Col. 3, line 37 to Col. 5, line 8, in particular):

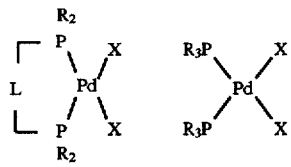

If desired, the catalyst can be selected from the following formulae where R and L are defined as in the previous set of formulae:

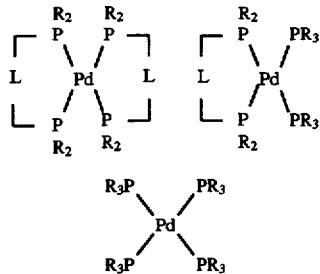

The reaction is advantageously conducted in a polar organic solvent at representative temperatures of from about 100° C. to about 300° C. in the presence of an inorganic or organic bases that are hydrohalide acceptor. Representative inorganic bases include the metal oxides, hydroxides and carbonates while representative organic bases include the alkyl and aryl amines.

In a particularly preferred embodiment, the electron-rich palladium(0) complex, [bis(diisopropylphosphino)propane]$_2$Pd, incorporating a chelating bulky trialkyl phosphine, which is abbreviated hereinafter as "(dippp)$_2$Pd (0)", was previously reported to catalyze reactions involving the carbonylation of aryl chlorides (see D. J. Milstein, J. Am. Chem. Soc. 1989, 111, 8742). It has been found that (dippp)$_2$Pd and other palladium(0) complexes with chelating bulky trialkyl phosphine ligands, synthesized separately or in situ, catalyze the formation of aramids from carbon monoxide, aromatic dichlorides, such as 1,4-dichlorobenzene, and aromatic diamines, such as 1,4-phenylenediamine, 4,4'-methylenedianiline, and 4,4'-oxydianiline. Additionally, the combination of a palladium (II) salt, a monodentate phosphine, and a chelating bulky trialkyl phosphine also displayed similar catalytic activity. Polar organic solvents, such as N,N-dimethylacetamide (DMAc), N,N-dimethylformamide (DMF), and N-methylpyrrolidinone (NMP) are preferred. Combinations of a polar organic solvent and a metal salt, such as lithium chloride or calcium chloride, to increase the solubility of the polymer can also be employed. For example, the reactions can be conducted at about 170° C. with a carbon monoxide pressure of about 75 psi, in the presence of 1,8-diazabicyclo [5.4.0]undec-7-ene ("DBU") as the base. However, other non-coordinating organic and inorganic bases may be used. The yield of aramid from 1,4-dichlorobenzene and either 1,4-phenylenediamine or 4,4'-methylenedianiline is typically very high and, in preferred embodiments, can be over 95%. The resultant polymers are soluble in sulfuric acid. They can be characterized by NMR and IR spectroscopy. The IR (KBr) spectra of the polymers will show a CO band at approximately at 1644 $cm^{-1}$. The presence of the carbonyl group can be further confirmed by $^{13}C$ NMR which will show a resonance at 170–175 ppm.

The present invention is further illustrated by the Examples which follow.

EXAMPLES

General Procedure. All reactions were set up in a dry nitrogen-filled glove box. The NMR spectra were obtained on a Bruker AM300 FT-NMR spectrometer. The chemical shifts were referenced either to a standard in a sealed capillary tube or to the solvent resonance at the appropriate frequency. IR (KBr) spectra were recorded on a Perkin-Elmer 1600 FT-IR spectrometer. All reactions were performed in glass liners in 125 mL or 300 mL stirred autoclaves manufactured by Parr Instrument Company.

Materials. Bis(diisopropylphosphino)propane (hereinafter abbreviated as "dippp") was prepared as described in the literature by K. J. Tani, Organomet. Chem. 1985, 279, 87. Other chemicals (Aldrich) were used as received.

Example 1

This Example illustrates a representative polymerization reaction in accordance with the present invention.

In this reaction, 22.4 mg ($1.0 \times 10^{-4}$ mol) of $Pd(OAc)_2$, 55.2 mg ($2.0 \times 10$-4 mol) of dippp, 2.06 g ($13.6 \times 10^{-3}$ mol) of DBU, 1.0 g ($6.8 \times 10^{-3}$ mol) of 1,4-dichlorobenzene, and 0.74 g ($6.8 \times 10^{-3}$ mol) of 1,4-phenylenediamine were placed in a glass liner and dissolved with 15 mL of DMAc. The liner was put in a Parr bomb. The pressure vessel was degassed and filled with nitrogen three times and then pressurized with 75 psi of carbon monoxide. After stirring magnetically at 170° C. for six hours, the unreacted carbon monoxide was released, and the reaction mixture was filtered. The solid polymer was washed twice with 40 mL of DMAc, and twice with 40 mL of methanol and was then dried under vacuum to yield 1.48 g of a yellow solid having an inherent viscosity, $\eta_{inh}$ (0.5 wt % in 98% $H_2SO_4$) of 0.16 dl/g at 25° C.

Example 2

In this polymerization run, 22.4 mg ($1.00 \times 10^{-4}$ mol) of $Pd(OAc)_2$, 22.8 mg ($1.00 \times 10^{-4}$ mol) of dippp ligand, 32 mg ($2.0 \times 10^{-4}$ mol) of triisopropylphosphine, 2.06 g ($13.6 \times 10^{-3}$ mol) of DBU, 1.0 g ($6.8 \times 10^{-3}$ mol) of 1,4-dichlorobenzene, and 0.74 g ($6.8 \times 10^{-3}$ mol) of 1,4-phenylenediamine were placed in a glass liner and dissolved with 15 mL of DMAc. The liner was put in a Parr bomb. The pressure vessel was degassed and filled with $N_2$ three times and then pressurized with 75 psi of carbon monoxide. After stirring magnetically at 170° C. for six hours, the unreacted carbon monoxide was released, and the reaction mixture was filtered. The solid polymer was washed twice with 40 mL of DMAc and twice with 40 mL of methanol and was then dried under vacuum to yield 1.50 g of a yellow solid having an inherent viscosity, $\eta_{inh}$ (0.5 wt % in 98% $H_2SO_4$) of 0.12 dl/g at 25° C.

Example 3

In this polymerization reaction, 30.0 mg ($6.6 \times 10^{-5}$ mol) of $Pd(dippp)Cl_2$, 17.3 mg ($6.6 \times 10^{-5}$ mol) of triphenylphosphine, 2.06 g ($13.6 \times 10^{-3}$ mol) of DBU, 1.0 g ($6.8 \times 10^{-3}$ mol) of 1,4-dichlorobenzene, and 0.74 g ($6.8 \times 10^{-}$3 mol) of 1,4-phenylenediamine were placed in a glass liner and dissolved with 15 mL of DMAc. The liner was put in a Parr bomb. The pressure vessel was degassed and filled with nitrogen three times and then pressurized with 75 psi of carbon monoxide. After stirring magnetically at 170° C. for six hours, the unreacted carbon monoxide was released, and the reaction mixture was filtered. The solid polymer was washed twice with 40 mL of DMAc and twice with 40 mL of methanol and was then dried under vacuum to yield 1.30 g of a yellow solid having an inherent viscosity, $\eta_{inh}$ (0.5 wt % in 98% $H_2SO_4$) of 0.09 dl/g at 25° C.

Example 4

The procedure utilized in previous Examples was employed in this Example to synthesize poly(p-phenylene terephthalamide).

The reagents used were 1.47 g (0.01 mol) of 1,4-dichlorobenzene and 1.08 g (0.01 mol) of 1,4-diaminobenzene under 75 psi of carbon monoxide and at a temperature of 170° C. in 30 mL of DMAC solvent with DBU used as the base. The catalyst comprised $5.0 \times 10^{-5}$ mol of $Pd(OAc)_2$ and $1.0 \times 10^{-4}$ mol of dippp. A 97% yield of the desired product was obtained in twenty hours (substrate/catalyst of about 200), and the product had an inherent viscosity, $\eta_{inh}$ (0.5 wt % in 98% $H_2SO_4$), of 0.16 dl/g at 25° C.

Further Examples are shown in Chart 1, below, which illustrates the range of diamines that can be employed, as well as diamines that do not work, in reactions which all utilized the following reaction conditions:

Catalyst: $Pd(OAc)_2$ (0.1 mmol)+dippp (0.2 mmol)
Solvent: 15 mL of DMAc
Base: DBU
CO: 75 psi
1,4-dichlorobenzene: 1.0 g (6.8 mmol)
Diamine: 6.8 mmol
Temp.: 170° C.
Reaction Time: 5 hrs.

| CHART 1 Diamine Used | | |
|---|---|---|
| Diamine | Products (g) | $\eta_{inh}$ (25° C.) |
| (I) | 1.49 | 0.16 |
| (II) | 2.10 | 0.23 |
| (III) | 2.10 | 0.21 |
| (IV) | NR* | — |

-continued

CHART 1
Diamine Used

| Diamine | Products (g) | $\eta_{inh}$ (25° C.) |
|---------|--------------|------------------------|
| (V)     | Trace        | —                      |
| (VI)    | NR           | —                      |

*signifies no reaction occurred.

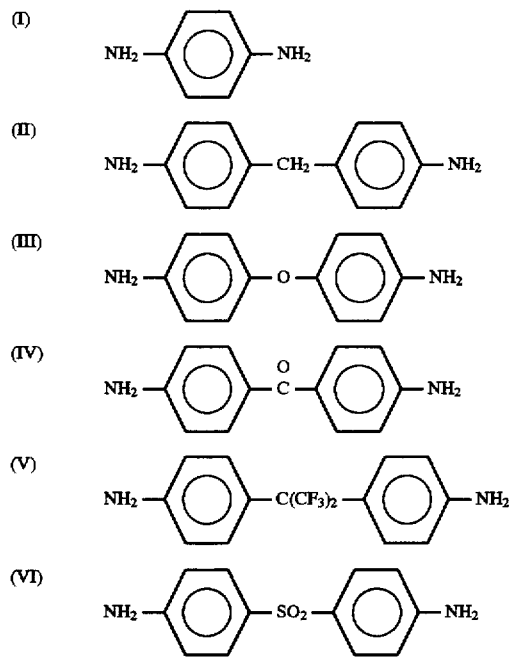

The foregoing Examples, since they are presented for illustrative purposes only, should not be construed in a limiting sense. The scope of protection sought is set forth in the claims which follow.

We claim:

1. A process for the synthesis of an aramid by the catalyzed reaction of carbon monoxide, an aromatic dichloride, and a diamine.

2. A process as claimed in claim 1 wherein the reaction is catalyzed by a palladium compound with a chelating bulky trialkyl phosphine.

3. A process as claimed in claim 2 wherein the chelating bulky trialkyl phosphine is bis(diisopropylphosphino) propane.

4. A process as claimed in claim 1 wherein the aromatic dichloride is 1,4-dichlorobenzene.

5. A process as claimed in claim 1 wherein the diamine is 1,4-diaminobenzene.

6. A process as claimed in claim 1 wherein the reaction is catalyzed by a palladium compound with a chelating bulky trialkyl phosphine, the aromatic dichloride is 1,4-dichlorobenzene, and the diamine is 1,4-diaminobenzene.

7. A process as claimed in claim 1 wherein the reaction is catalyzed by a palladium compound with bis (diisopropylphosphino)propane as a chelating bulky trialkyl phosphine, the aromatic dichloride is 1,4-dichlorobenzene, and the diamine is 1,4-diaminobenzene.

* * * * *